(No Model.)

T. H. STONE & H. CORSER.
TIRE FOR CYCLES.

No. 481,435.  Patented Aug. 23, 1892.

Witnesses
Henry F Talbot
W Bernard Currall

Inventors
Thomas Hobby Stone
Harvington Corser

UNITED STATES PATENT OFFICE.

THOMAS HOBLEY STONE AND HARVINGTON CORSER, OF BIRMINGHAM, ENGLAND.

TIRE FOR CYCLES.

SPECIFICATION forming part of Letters Patent No. 481,435, dated August 23, 1892.

Application filed February 2, 1892. Serial No. 420,119. (No model.) Patented in France January 15, 1892, No. 218,742; in Germany January 15, 1892, No. 27,720, and in Belgium January 18, 1892, No. 97,966.

*To all whom it may concern:*

Be it known that we, THOMAS HOBLEY STONE and HARVINGTON CORSER, subjects of the Queen of Great Britain, both residents of Birmingham, England, have invented certain Improvements in Tires for Cycles and other Road-Vehicles, (for which we have obtained patents in Belgium, No. 97,966, dated January 18, 1892; in France, No. 218,742, dated January 15, 1892, and in Germany, No. 27,720, dated January 15, 1892,) of which the following is a specification.

This invention refers to tires of india-rubber and such like material, and has for its object the construction of a tire capable of being fixed upon the felly or rim of the wheel without the use of cement or any other substance or material.

Figure 1:
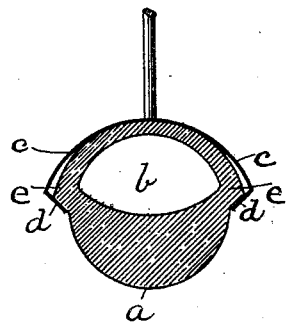
Figure 3:
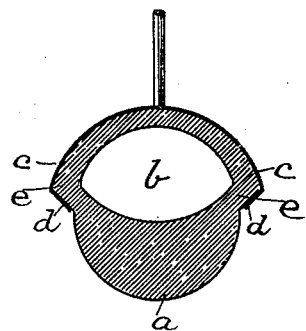
Figure 2:
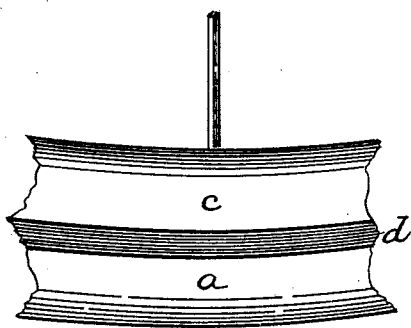
Figure 4:
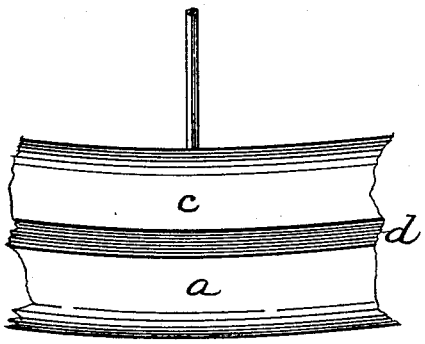

In the accompanying drawings, which illustrate our invention, Figures 1 and 2 are a section and side elevation, respectively, of our improved tire placed upon the rim or felly of a wheel prior to being operated upon so as to remain in position; and Figs. 3 and 4 are a section and side elevation of the same when the tire is fixed in position.

For the purposes of this our invention we form the tire of a sectional shape, consisting of a solid portion on that side which is to form the outer face or portion next to the road and an air-chamber for the back portion or part upon the rim or felly of the wheel, and we form the rim or felly of the wheel of a half-circle, (or slightly more or less,) with a rim on each of its outer edges slightly turned inward. The tire is made as a band or ring just sufficiently large to lie within this hollowed felly with but little or no stretching.

In order to fix the tire firmly in position, the air-chamber portion of it is inflated from the back through a valve-closed hole by an air-pump.

Referring to the drawings, $a$ is the solid portion, and $b$ the tubular or air-chamber portion.

$c$ is the metal rim or felly, with the pieces $d$ $d$ turned in to receive the shoulders $e$ $e$ of the tire.

Before the tire is inflated it lies loosely within the felly, as shown in Fig. 1; but when it is inflated the air-chamber $b$ expands, the thick portion $a$ is thrown farther out, and the back portion driven tightly into the rim $c$, as shown in Fig. 3. A tire thus formed can be readily removed for replacing a broken spoke by allowing the air to escape from the air-chamber, and thus loosening the tire, and if the tire should become loose in wear it is readily tightened by blowing more air into the air-chamber, or if the portion $a$ should become worn by wear, this defect can be remedied by further inflating the tire. In this form of tire the objection common to most pneumatic tires of the tire becoming destroyed by the rubber being cut is overcome by having that portion of the tire which is exposed to wear ($a$ upon the drawings) of a thickness approaching that of an ordinary solid tire.

We make no claim to any special mode of inflating the tire, but do it in the ordinary way through a valve within a tube placed through the back of the rim $c$ into an opening for that purpose in the air-chamber $b$.

We are aware that the use of inflated tires is not new, and we make no claim for such; but What we do claim as our invention, and desire to secure by Letters Patent, is—

The combination, with a felly $c$, having inwardly-turned edges, of an elastic tire formed with shoulders $e$, comprising a thickened solid portion $a$ and the tubular portion $b$, said solid and tubular portions formed integral with each other, said tubular portion adapted to seat within the felly $c$, the inwardly-turned edges of which engage the shoulders $e$ of the tire, substantially as described.

THOMAS HOBLEY STONE.
HARVINGTON CORSER.

Witnesses:
HENRY T. TALBOT,
ERNEST HARKER,
*U. S. Consulate, Birmingham, England.*